(12) United States Patent
Hillekes et al.

(10) Patent No.: US 7,201,413 B2
(45) Date of Patent: Apr. 10, 2007

(54) CRASH BOX

(75) Inventors: Bernhard Hillekes, Paderborn (DE); Achim Kröning, Paderborn (DE); Hui Wang, Paderborn (DE); Michael Roll, Bielefeld (DE); Dirk Kroeger, Lichtenau (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 11/201,015

(22) Filed: Aug. 10, 2005

(65) Prior Publication Data

US 2006/0033363 A1 Feb. 16, 2006

(30) Foreign Application Priority Data

Aug. 13, 2004 (DE) .................... 10 2004 039 592

(51) Int. Cl.
*B60R 19/34* (2006.01)
(52) U.S. Cl. ...................... 293/133; 188/377
(58) Field of Classification Search ............... 293/132, 293/133, 154, 155; 296/187.03, 187.09, 296/187.1, 187.11; 188/377
See application file for complete search history.

(56) References Cited

U.S. PATENT DOCUMENTS 3,633,934 A 1/1972 Wilfert
4,152,012 A 5/1979 Reidelbach et al.
4,929,008 A * 5/1990 Esfandiary ................... 293/108
5,785,367 A 7/1998 Baumann et al.

FOREIGN PATENT DOCUMENTS

| DE | 42 38 631 | 5/1994 |
|---|---|---|
| DE | 195 22 575 | 1/1996 |
| DE | 296 22 715 | 5/1997 |
| DE | 197 09 171 | 6/1998 |
| DE | 298 08 143 | 9/1998 |
| DE | 100 14 469 | 10/2001 |
| WO | WO 99/15364 | 4/1999 |

* cited by examiner

*Primary Examiner*—Joseph D. Pape
(74) *Attorney, Agent, or Firm*—Henry M. Feiereisen

(57) ABSTRACT

A crash box for installation between a longitudinal member and a bumper cross member of a motor vehicle, includes a sheet metal body having a deformation member which extends anteriorly of an end surface of the longitudinal member and whose maximum crumpling capability defines the energy absorption of the crash box. In prolongation of the deformation member is an attachment member which is engaged in the longitudinal member and detachably secured by bolts therein. Formed in a transition zone between the deformation member and the attachment member, is a stop which is configured in the form of an outwardly directed material protuberance or outwardly directed thickened area of the sheet metal body and bearing against the end surface of the longitudinal member.

13 Claims, 3 Drawing Sheets

CRASH BOX

CROSS-REFERENCES TO RELATED APPLICATIONS

This application claims the priority of German Patent Application, Ser. No. 10 2004 039 592.6, filed Aug. 13, 2004, pursuant to 35 U.S.C. 119(a)–(d), the subject matter of which is/are incorporated herein by reference.

BACKGROUND OF THE INVENTION

The present invention relates to a crash box for the bumper of a motor vehicle.

Nothing in the following discussion of the state of the art is to be construed as an admission of prior art.

Bumpers are typically arranged across the front and rear of a motor vehicle between the plastic shell of the vehicle body and the frame of the motor vehicle. To prevent damage to the vehicle structure in the event of a frontal crash or impact from the rear at low speeds, deformation elements are integrated which are also called crash boxes. Crash boxes are thin-walled elements, normally rectangular and made of steel, aluminum or plastic. They can be manufactured by joining compressed sheet metal shells or in single-piece construction, for example in the form of extruded aluminum section.

The crash boxes between the longitudinal member and the bumper cross member absorb kinetic energy generated in the event of an impact by converting the impact energy into deformation work. This prevents permanent damage to the longitudinal member when a critical stress level is exceeded.

German Offenlegungsschrift DE 100 14 469 A1 discloses a rectangular crash box composed of a top shell and a bottom shell. Embossments are formed in the crash boxes to realize a targeted deformation at a particular area. The crash box is supported on the end surface of the longitudinal member via a flanged plate. Screwed connections in the flanged plate connect the crash box to the longitudinal member. This requires in the area of the longitudinal member a suitably designed attachment zone, i.e. the presence of a respective flange.

German utility model DE 296 22 715 U1 discloses an impact absorber for a motor vehicle for engagement into the end of the bumper cross member. The impact absorber is hereby connected to the cross member by screws inserted transversely thereto.

Telescopic dampers which are pushed into the longitudinal member in the event of an impact are disclosed, for example, in International publication no. WO 99/15364 or U.S. Pat. No. 3,633,934. German Offenlegungsschrift DE 42 38 631 A1 discloses a shock absorbing structure for a bumper using an inner tube and an outer tube which are placed within one another, with the outer tube having a flange for support upon the longitudinal member. German utility model DE 298 08 143 U1 discloses a crash box which is secured to the longitudinal member by transverse bolts. As the crash box is attached on the side, the need for installation space is increased in a same way as the securement using flanges.

It would therefore be desirable and advantageous to provide an improved crash box which obviates prior art shortcomings and which is so constructed as to require little space so that available installation space can be utilized in an optimum way while having reduced weight and yet being reliable in the event of an impact operation.

SUMMARY OF THE INVENTION

According to one aspect of the present invention, a crash box for installation between a longitudinal member and a bumper cross member of a motor vehicle includes a body made of sheet metal and having a deformation member which extends anteriorly of an end surface of the longitudinal member and whose maximum crumpling capability defines the energy absorption of the crash box, an attachment member constructed for engagement into the longitudinal member, bolt fasteners for detachably securing the attachment member to the longitudinal member, and a stop extending outwards in a transition zone between the deformation member and the attachment member and bearing against the end surface of the longitudinal member.

According to another feature of the present invention, the stop may be constructed in the form of an outwardly directed material protuberance. As an alternative, the stop may be constructed in the form of an outwardly directed thickened area of a wall surface in the transition zone. The material protuberance or the material thickening not only forms a stop in order to transmit impact forces introduced into the crash box to the longitudinal member but also assists a precise installation of crash box in the longitudinal member via the bolts, e.g. stud bolts, which can be inserted in Y direction and/or Z direction. The Z direction defines hereby the vertical axis of a coordinate system whereas the Y direction defines the transverse axis of the motor vehicle. The absence of flanged plates in the crash box and the longitudinal member results in a significant reduction in weight, and at the same time the absence of flanged plates in immediate proximity of the crash box results also in added installation space.

As a consequence of the construction of a crash box according to the present invention, deformation of the crash box takes place basically in the deformation member and not in the area of the longitudinal member. The stud bolts for securing the attachment member to the longitudinal member are thus different from shearing bolts that allow a shift of the crash box into the longitudinal member when under excessive stress. Stud bolts provide a force introduction of the normal force into the overlapping area of the crash box and the longitudinal member for generating a friction force which opposes the force introduced in the event of a crash. The stop in the form of a material protuberance or material thickening and bearing against the end surface of the longitudinal member is able to absorb further forces.

According to another feature of the present invention, the stop may bear upon a longitudinal side and/or transverse side of the longitudinal member. Basically, a maximum contact area upon the end surface of the longitudinal member or in circumferential direction of the crash box is desired in order to be able to introduce the impact forces into the walls of the longitudinal member with little surface pressure via the stop. At the same time, the cross section of the crash box is not significantly increased as a consequence of the stop. Suitably, the material protuberance can be determinative for a maximum outer diameter of the body of the crash box.

Although the provision of a rectangular cross section for a crash box according to the invention is currently preferred, it is, of course, conceivable to configure the crash box of any suitable cross section, including any polygonal configuration. Even round cross sections are feasible. The cross section may change along the length dimension of the crash box, e.g., expand or, as currently preferred, taper. A rectangular crash box may taper, for example, in the form of a truncated pyramid. Such configuration results in a maximum cross sectional area of the transverse plane intersecting the stop.

Normally, the attachment member of the crash box has a diameter which is smaller than the diameter in the area of the stop because the attachment member is constructed for insertion through the end of the longitudinal member and disposed inside the longitudinal member. The length of the attachment member may be significantly shorter than the length of the deformation member. This is advantageous compared to crash boxes that are pushed into the longitudinal member in the event of an impact.

A crash box according to the present invention can have in immediate succession of the attachment member a cross sectional configuration which can be suited to local requirements. For example, the crash box may be reduced in diameter.

According to another feature of the present invention, a further stop may be provided inside the longitudinal member for abutment by the attachment member, when installed. The presence of the further stop provides additional support of the crash box inside the longitudinal member. In this way, impact forces are thus absorbed by the two stops so that the longitudinal member is subjected to lesser surface pressure. Suitably, the further stop is arranged on the longitudinal member.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
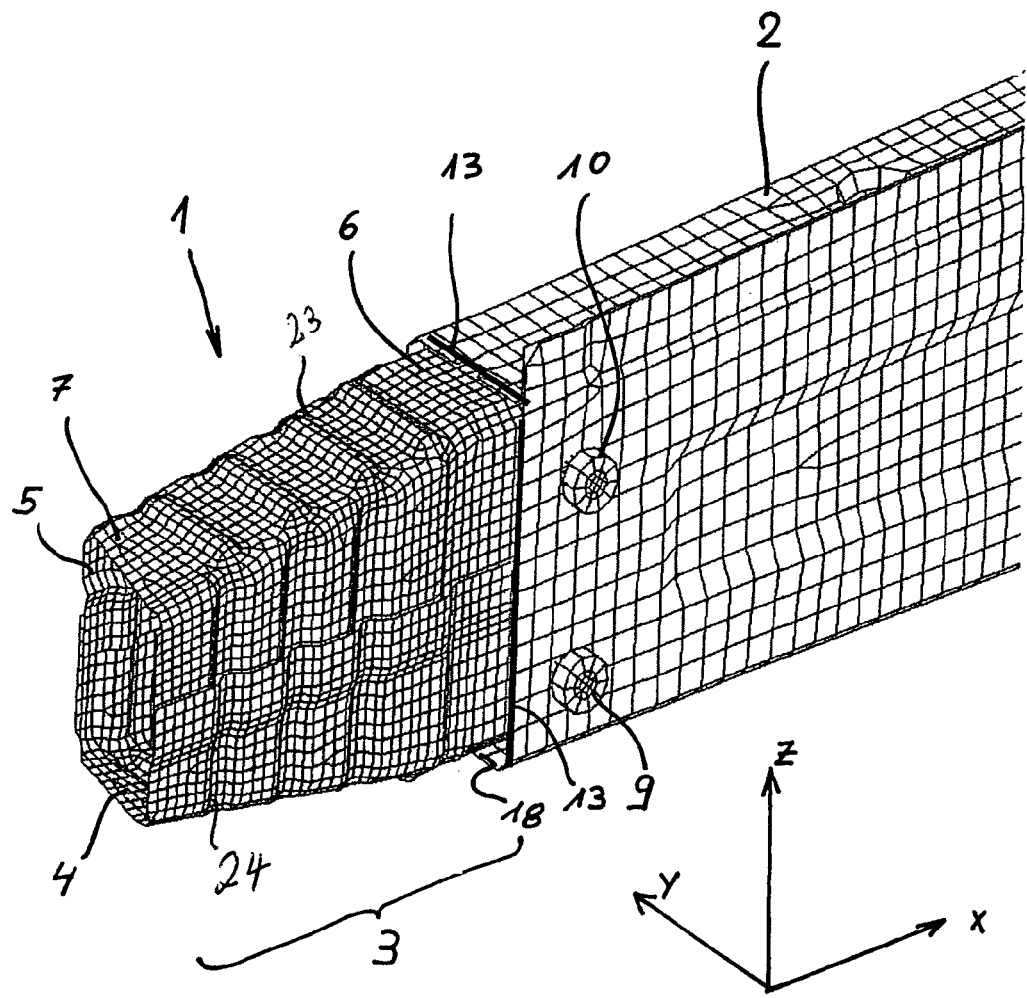
FIG. 1 is a basic perspective illustration of a crash box according to the present invention for insertion in a longitudinal member of a motor vehicle.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a basic perspective illustration of a crash box according to the present invention, generally designated by reference numeral 1. The crash box 1 is a deformation element that absorbs energy in the event of impact and is mounted between an unillustrated bumper cross member and a longitudinal member 2 of an otherwise unillustrated chassis of a motor vehicle. The crash box 1 has a body which is made of a sheet metal part and includes a deformation member 3 in the form of an elongate hollow body which is configured as thin-walled metal structure of U shaped configuration with two shells 4, 5, namely a bottom shell 4 and a top shell 5. The U shaped shells 4, 5 overlap with their legs in Z direction and are joined together along overlapping portions of the legs. The legs of the top shell 5 are nested hereby inside the legs of the bottom shell 4.

The deformation member 3 has a configuration in the form of a truncated pyramid and tapers from an end 6 of the longitudinal member 2 toward an end 7 where the bumper cross member is located. The deformation member 3 is formed with embossments 23, 24 extending in Z direction as well as Y direction, as shown by the coordinate system in FIG. 1. The embossments 23 in Z direction extend hereby inwardly on the sides of the deformation member 3, whereas the embossments 24 in Y direction extend outwardly along the top and bottom sides of the deformation member 3. Persons skilled in the art will understand that the embossment pattern and profile may certainly be constructed in any desired manner and can be suited to the situation at hand. Although not shown here, it is also feasible to form embossments in X direction. Of course, the absence of any embossments may also be conceivable for a crash box according to the present invention.

Figure 2:
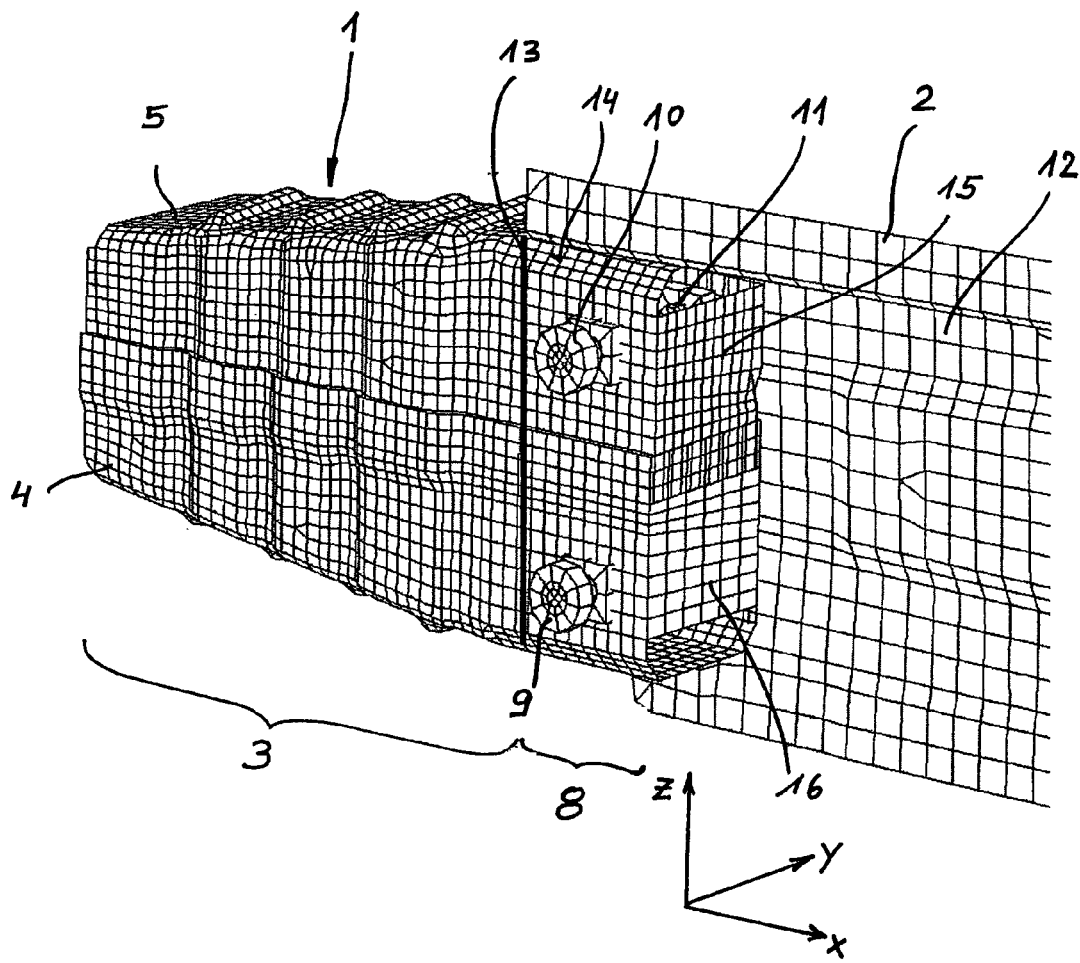
FIG. 2 is a perspective illustration of the crash box of FIG. 1, with part of the longitudinal member being broken open.

Turning now to FIG. 2, there is shown a perspective illustration of the crash box 1, with part of the longitudinal member 2 being broken open to illustrate the presence of an attachment member 8 in prolongation of the deformation member 3 and received in the longitudinal member 2. Currently preferred is the construction of the deformation member 3 and the attachment member 8 from a single sheet metal part. Bolts 9, 10, 11 secure the attachment member 8 in a wall 12 of the longitudinal member 2. The bolts 9, 10, 11, e.g. stud bolts, are inserted here by way of example in Y direction. A total of four bolts are provided (only three are at least partly visible) and arranged in pairs that oppose one another. Formed in a transition between the deformation member 3 and the attachment member 8 is a stop 13 which is shown in FIGS. 1 and 2 only by way of a bold line but illustrated in greater detail in FIGS. 3 to 5 by way of various embodiments as will be described furtherbelow. The stop 13 may be configured by way of an outwardly directed material protuberance or by way of an outwardly directed greater wall thickness of the sheet metal part of the crash box 1.

As shown in FIG. 1, the stop 13 extends in Y direction as well as in Z direction. In other words, the stop 13 is wrapped like a collar about the crash box 1, except for the corner areas 14 of the attachment member 8. The corner areas 14 are hereby of slanted configuration.

As shown in particular in FIG. 2, the legs of the shells 4, 5 are connected via side walls 15, 16 at an end distal to the bumper cross member.

Figure 3:
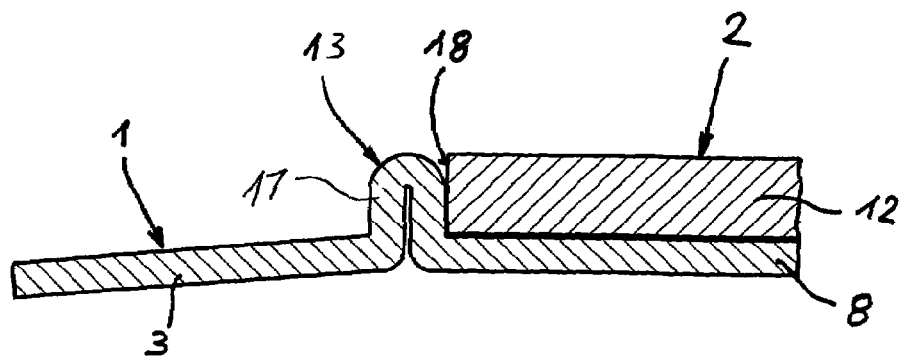
FIG. 3 is a schematic sectional view of a crash box according to the present invention, depicting in greater detail one embodiment of a stop.
Figure 4:
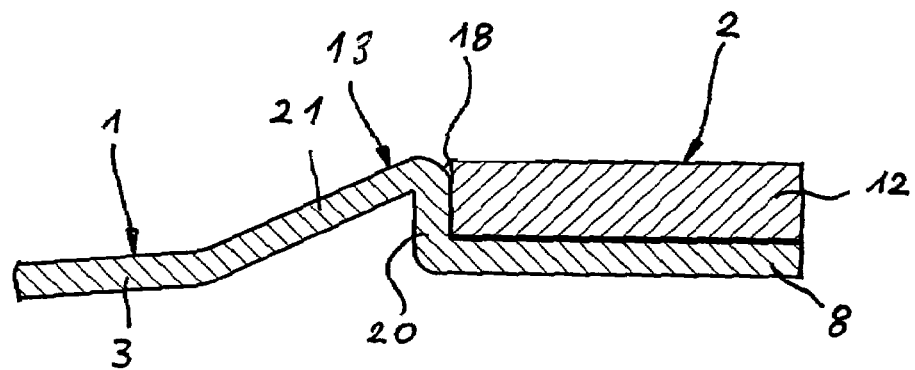
FIG. 4 is a schematic sectional view of a crash box according to the present invention, depicting in greater detail another embodiment of a stop.
Figure 5:
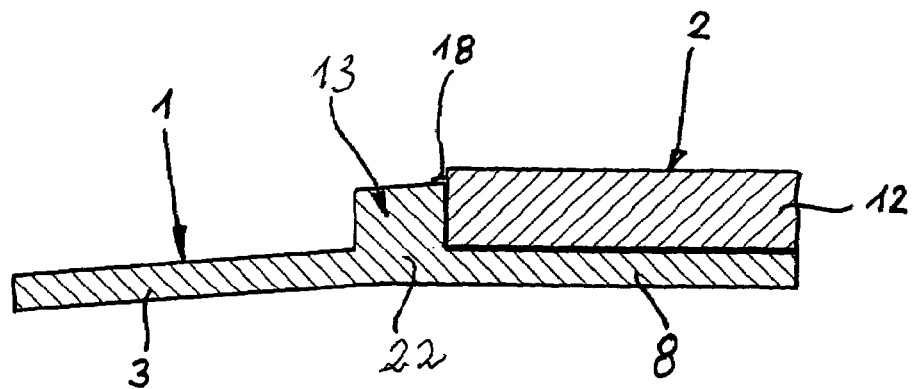
FIG. 5 is a schematic sectional view of a crash box according to the present invention, depicting in greater detail yet another embodiment of a stop.

Turning now to FIGS. 3 to 5, there are shown sectional views of various embodiments to implement the stop 13. Parts corresponding with those in FIG. 1 are denoted by identical reference numerals and not explained again. According to FIG. 3, the stop 13 is realized by forming an outwardly directed material protuberance 17 which bears in substantial parallel relationship upon the end surface 18 of the wall 12 of the longitudinal member 2. Although FIG. 3 shows the material protuberance 17 in the form of a fold-like collar, any configuration realizing a material protuberance is conceivable. Another example of such a material protuberance is shown in FIG. 4 in which the stop 13 has a triangular cross section, defined by legs 20, 21 extending asymmetrically to one another. The leg 20 extends in parallel relationship to the end surface 18 of the wall 12 of the longitudinal member 2, whereas the leg 21 extends like a ramp at an angle to the leg 20. The length of the leg 21, the angle of inclination, and the concrete construction of the crash box is hereby dependent on the used material, on the deformation property of the material, and on the wanted deformation characteristic of the crash box 1.

FIG. 5 shows a stop 13 which is realized by constructing the body shell with partly different wall thickness to thereby form a thickened area 22 which bears upon the end surface 18 of the longitudinal member 12 and provides support of the crash box 1.

Common to all embodiments of a crash box 1 according to the present invention is the realization of a stop 13 which saves installation space and which provides an optimum support of the crash box 1 upon the longitudinal member 2 while yet being easy to make and of little weight. As a result, the crash box 1 does not project in the area of the stop 13 beyond the terminal cross section of the longitudinal member 2. Only the heads of the bolts 9, 10, 11 for securement of the crash box 1 to the longitudinal member 2 may need additional installation space. This, however, is insignificant.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A crash box for installation between a longitudinal member and a bumper cross member of a motor vehicle, said crash box comprising:
    a body made of sheet metal, said body including
        a deformation member which extends anteriorly of an end surface of the longitudinal member and whose maximum crumpling capability defines the energy absorption of the crash box,
        an attachment member constructed for engagement into the longitudinal member,
        bolt fasteners for detachably securing the attachment member to the longitudinal member, and
        a stop extending outwards in a transition zone between the deformation member and the attachment member and bearing against the end surface of the longitudinal member.

2. The crash box of claim 1, wherein the stop is constructed in the form of an outwardly directed material protuberance.

3. The crash box of claim 1, wherein the material protuberance is constructed as a fold of the body and extends in substantial parallel relationship to the end surface of the longitudinal member.

4. The crash box of claim 1, wherein the material protuberance is constructed in the form of a triangle having a vertical leg in parallel relationship to the end surface of the longitudinal member.

5. The crash box of claim 1, wherein the stop is constructed in the form of an outwardly directed thickened area of a wall surface in the transition zone.

6. The crash box of claim 1, wherein the stop extends substantially about a circumference of the body.

7. The crash box of claim 2, wherein the material protuberance is determinative for a maximum outer diameter of the body.

8. The crash box of claim 5, wherein the thickened area of the wall surface in the transition zone is determinative for a maximum outer diameter of the body.

9. The crash box of claim 1, wherein the bolt fasteners are stud bolts.

10. The crash box of claim 1, wherein the deformation member tapers outwardly from the end surface of the longitudinal member.

11. The crash box of claim 1, wherein the deformation member tapers outwardly from the end surface of the longitudinal member in the form of a truncated pyramid.

12. The crash box of claim 1, wherein the attachment member is shorter in length than the deformation member.

13. A crash box for a bumper of a motor vehicle, comprising:
    a deformation member;
    an attachment member in prolongation of the deformation member and constructed for engagement into a longitudinal member of a vehicle,
    a fastener for detachably securing the attachment member to the longitudinal member, and
    a stop extending outwards in a transition zone between the deformation member and the attachment member and bearing against an end surface of the longitudinal member.

* * * * *